US006181256B1

(12) United States Patent
Fitzsimmons et al.

(10) Patent No.: US 6,181,256 B1
(45) Date of Patent: Jan. 30, 2001

(54) REMOTELY OPERABLE SWITCH ACTUATOR AND METHOD FOR RETROFITTING A MANUALLY OPERATED ENCLOSED ELECTRICAL DISCONNECT SWITCH

(75) Inventors: George Fitzsimmons; David Emerson Greer, both of Lexington, KY (US)

(73) Assignee: Square D Company, Palatine, IL (US)

( * ) Notice: Under 35 U.S.C. 154(b), the term of this patent shall be extended for 0 days.

(21) Appl. No.: 08/993,068

(22) Filed: Dec. 18, 1997

(51) Int. Cl.[7] .......... H04Q 1/00
(52) U.S. Cl. .......... 340/825.72; 361/172
(58) Field of Search .......... 340/825.69, 825.72; 315/291; 361/172

(56) References Cited

U.S. PATENT DOCUMENTS 3,445,848 * 5/1969 Goldstein .......... 340/825.72
3,686,672 * 8/1972 Ishizuka .......... 340/825.72
4,410,789 * 10/1983 Story .......... 340/825.72
5,047,765 * 9/1991 Munekata .......... 340/825.72
5,099,193 * 3/1992 Moseley .......... 340/825.72
5,644,302 * 7/1997 Hana .......... 340/825.72

* cited by examiner

*Primary Examiner*—Brian Zimmerman
(74) *Attorney, Agent, or Firm*—David R. Stacey; Larry I. Golden

(57) ABSTRACT

A remotely operable switch actuation module for retrofitting a manually operated disconnect switch. The switch actuation module includes a linear operator which produces a linear movement in response to an external signal and a mechanical interface shaft which translates the linear movement into rotational movement required by the switch operating mechanism to change the ON or OFF state of the disconnect switch. The ends of the mechanical interface shaft are provided with engagement means complementary to the engagement means provide on switch operating mechanism pivot shaft and the operating arm of the manually operated disconnect switch. Therefore, the mechanical interface permits the switch operating mechanism to be engaged by either the remote switch actuation module or the manual operating arm. The switch actuation module also includes a switch status indicator which produces an electric signal indicating the ON or OFF state of the disconnect switch. The switch status signal is sent to a remote device for displaying or monitoring the disconnect switch ON or OFF status.

18 Claims, 7 Drawing Sheets

REMOTELY OPERABLE SWITCH ACTUATOR AND METHOD FOR RETROFITTING A MANUALLY OPERATED ENCLOSED ELECTRICAL DISCONNECT SWITCH

FIELD OF THE INVENTION

The present invention relates to the field of enclosed fusible switches, disconnect switches and the like and specifically to a remotely operable actuator kit for manually operated switch devices.

BACKGROUND OF THE INVENTION

Disconnect switches of both fusible and nonfusible types are well known in the industry. These switches are operated manually by means of a lever type operating arm movable between ON and OFF positions. These switches are usually employed to provide a local power disconnect means for a particular machine or electrically operated device such that a general power shutdown is not required for maintenance on the particular machine or device, or for other reasons which might require that power be temporarily disconnected from the particular machine or device. The operating arm is attached to the outside of the switch enclosure and mechanically connected to a switch operating mechanism located inside the switch enclosure. Since the switch operating mechanism and operating arm are mechanically connected together and become a part of the enclosure assembly, they are usually assembled to the switch enclosure at the same time. This has generally been accomplished by sandwiching a wall of the enclosure between the operator arm frame and the switch mechanism frame and riveting or welding this assembly together. As factory automation and central monitoring of machines and equipment increases, it is becoming more desirable to control the ON and OFF operations of these local disconnect switches from one centralized location, and also to monitor the ON or OFF state of the disconnect switch. At present, when remote operation of a local disconnect is required, the customer must employ a circuit breaker with a specially designed remote operating mechanism such as shown in U.S. Pat. No. 3,893,066 or a motor operated circuit breaker, or an electrical contactor in place of the less expensive disconnect switch. If the customer is upgrading an existing manufacturing line or electrical system, he must remove all existing manually operated local disconnect devices and replace them with the specially designed remotely operable local disconnect devices. This is extremely expensive and time consuming. It is therefore desirable to have a field installable inexpensive retrofit kit which can be used to convert an existing manually operated disconnect switch to a remotely operable disconnect switch without requiring removal or rewiring of the existing disconnect switch. This same conversion kit can be used to convert a standard manually operated disconnect switch to a remotely operable disconnect switch at the manufacturing location without requiring any special enclosures, assembly procedures or assembly tools.

SUMMARY OF THE INVENTION

The present invention provides a remote switch actuator module which can be used either during the disconnect switch manufacturing process or during a field retrofit of an installed manually operated disconnect switch to change a manually operated switch into a remotely operable switch. The remote switch actuator module is positioned between the switch enclosure and the existing manual operating handle. In some configurations the remote actuating module includes a manual operating arm and can completely replace the original manual operating handle. The remote actuator module includes a module housing which encloses a remotely operable mechanism providing a linear force. The remotely operable mechanism is mechanically connected to a mechanical interface which provides a means for changing the linear force or motion to a generally rotary force or motion. The mechanical interface also provides a mechanical connection between the remotely operable mechanism and a switch mechanism located inside the disconnect switch enclosure and also between the remotely operable mechanism and the manual operating handle. The mechanical interface can also provide activation for a switch status indicating device which provides the ON and OFF status information of the disconnect switch to a location remote from the disconnect switch. The remote switch actuating module is best suited for use with modularized switches of a type disclosed in U.S. Pat. No. 5,609,245 to Cassity et al., which issued Mar. 11, 1997, is assigned to the assignee of the present invention and is incorporated herein by reference. In this modularized switch assembly construction, the switch operating mechanism and switch operator arm are separate modules. The switch operating mechanism module is removably attached to the switch base module and the operating arm module is removably attached to the disconnect switch enclosure. The two modules are mechanically connected such that movement of the operating arm is transmitted to the switch operating mechanism. Conversion of an assembled modularized switch requires only the removal of the operating arm module from the switch enclosure, placing the remote switch actuating module in juxtaposed position with the switch enclosure such that the mechanical interface properly engages the switch operating mechanism, placing the operating arm module in juxtaposed position with the remote switch actuating module such that the operating arm module properly engages the mechanical interface and simultaneously attaching both the switch actuating module and the operating arm module to the switch enclosure.

Figure 1:
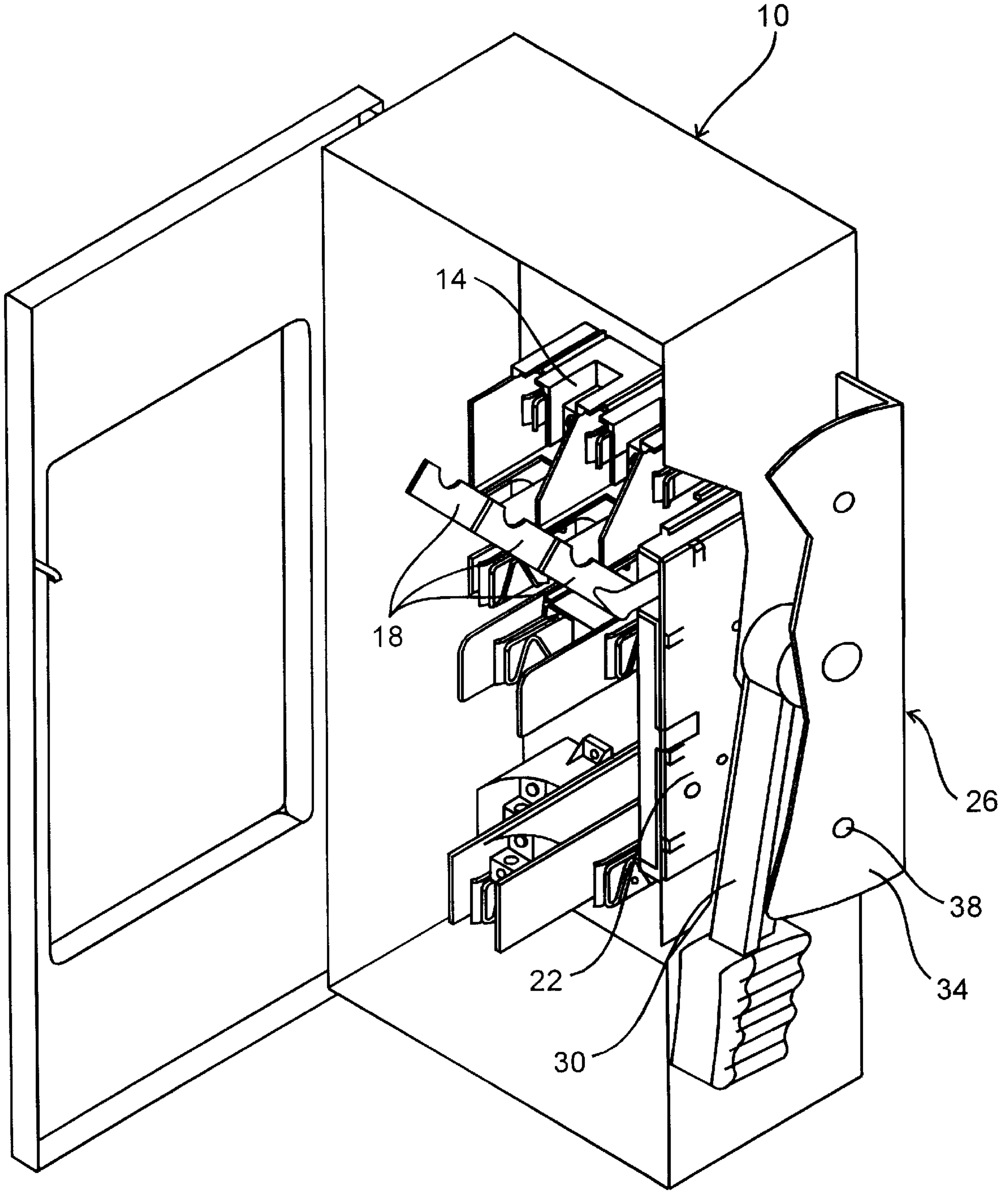
PRIOR ART Fig. 1
FIG. 1 is an isometric view of a modularized disconnect switch with an operating arm module installed.

Before one embodiment of the invention is explained in detail, it is to be understood that the invention is not limited in its application to the details of construction and description or as illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a modularized disconnect switch of the type disclosed in U.S. Pat. No. 5,609,245 to Cassity et al. and generally indicated by reference numeral 10. The switch 10 includes a switch base module 14 on which switch blades 18 are rotatably mounted, a switch operating mechanism module 22 and a switch operating arm module 26 which includes an operating arm 30, a mounting bracket 34 and attaching means such as screws 38.

Figure 2:
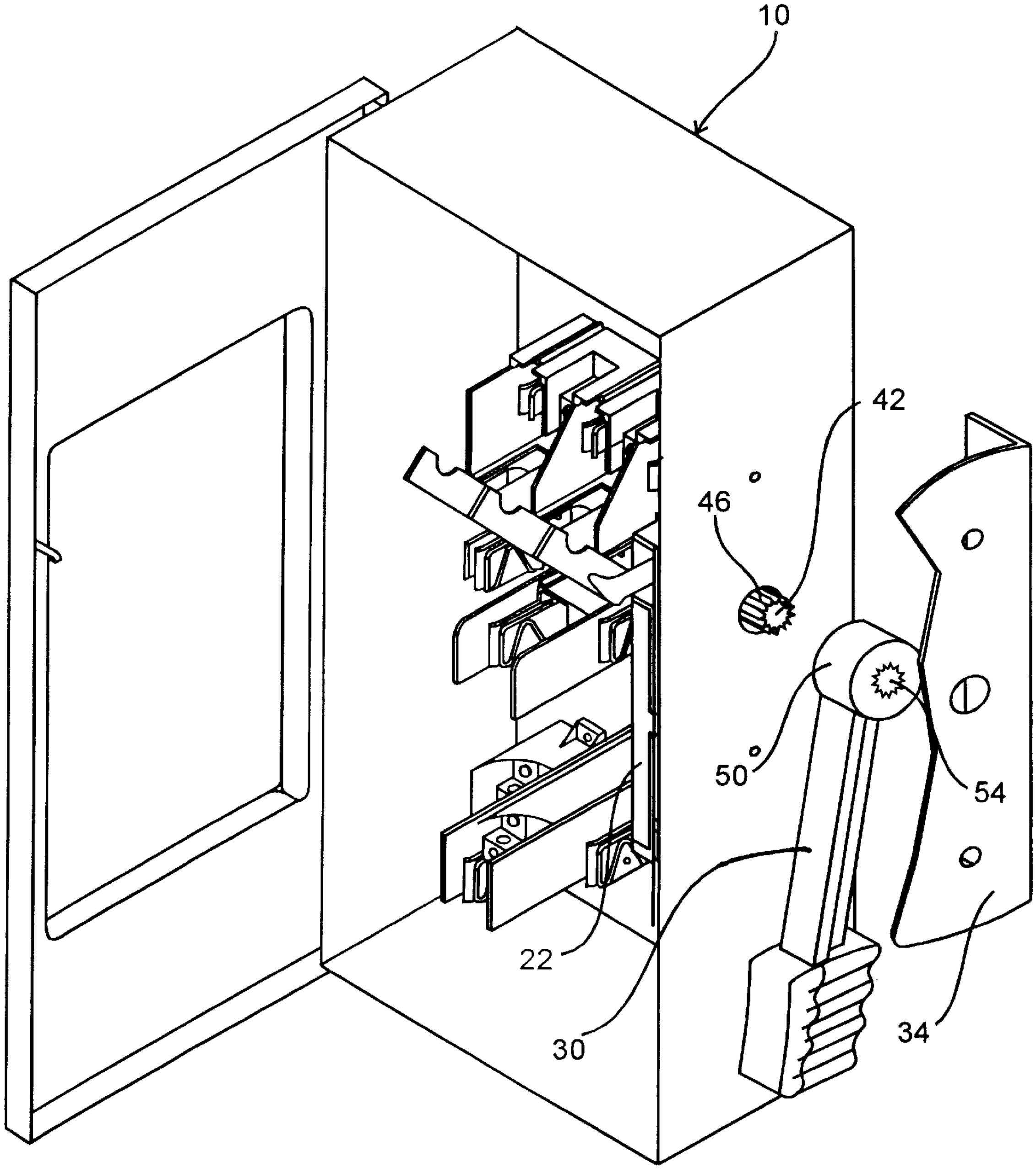
PRIOR ART Fig. 2
FIG. 2 is an isometric view of the modularized disconnect switch of FIG. 1 with the operating arm module removed.

FIG. 2 illustrates the switch 10 of FIG. 1 with the operating arm module 26 removed to show a pivot shaft 42 which is a part of the switch operating mechanism module 22 and which passes generally through the switch operating mechanism module 22 to transfer rotational movement of the operating arm 30 to the switch blades 18. The pivot shaft 42 has an operator end 46 which is provided with gears, splines, keys or other methods of engagement which permit the transmission of movement between the operating arm 30, or other operating device, and the pivot shaft 42. The operating arm 30 has a drive end 50 provided with a hole 54 configured with an engagement means complementary to that of the operating end 46 of the pivot shaft 42 and is dimensioned to snugly receive the operator end 46 of the pivot shaft 42. The other end of the pivot shaft 42 is provided with means for transferring motion to the switch blades 18 such that the switch can be opened or closed by manipulating the operating arm 30. The switch operating mechanism module 22 is an overcenter device partially powered by a spring which produces the "snap action" required to quickly open and close the blades 18 of the switch base module 14. This "snap action" reduces arcing as the switch makes or breaks the electrical circuit. The operating arm 30 is used to manually move certain elements of the operating mechanism, usually the spring, in a generally arcuate motion between two stable positions of the switch operating mechanism 22, one being the switch ON position and the other being the switch OFF position. As the pivot shaft 42 is moved from one stable position to the other the spring is compressed. As the moving element passes the center point between the two stable positions, the compressed spring takes over, causing the rapid completion of the switch mechanism movement and thereby opening or closing the switch blades 18 as the spring's stored energy is released.

Figure 3A:
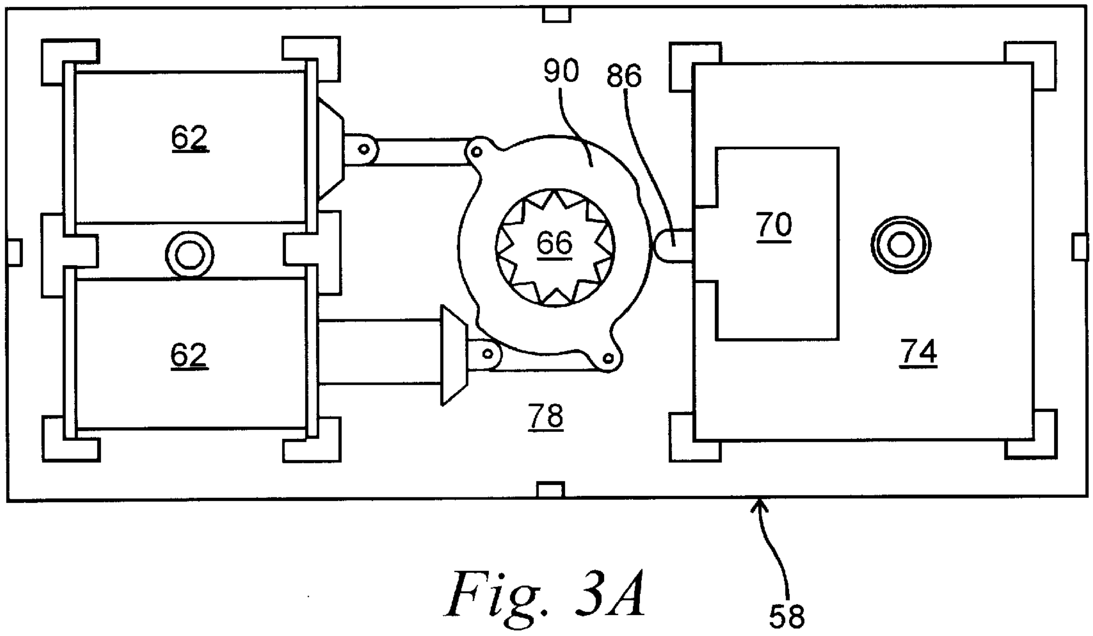
FIG. 3*a* is an interior view of a remote switch activating module in accordance with the present invention shown in the OFF position.
Figure 3B:
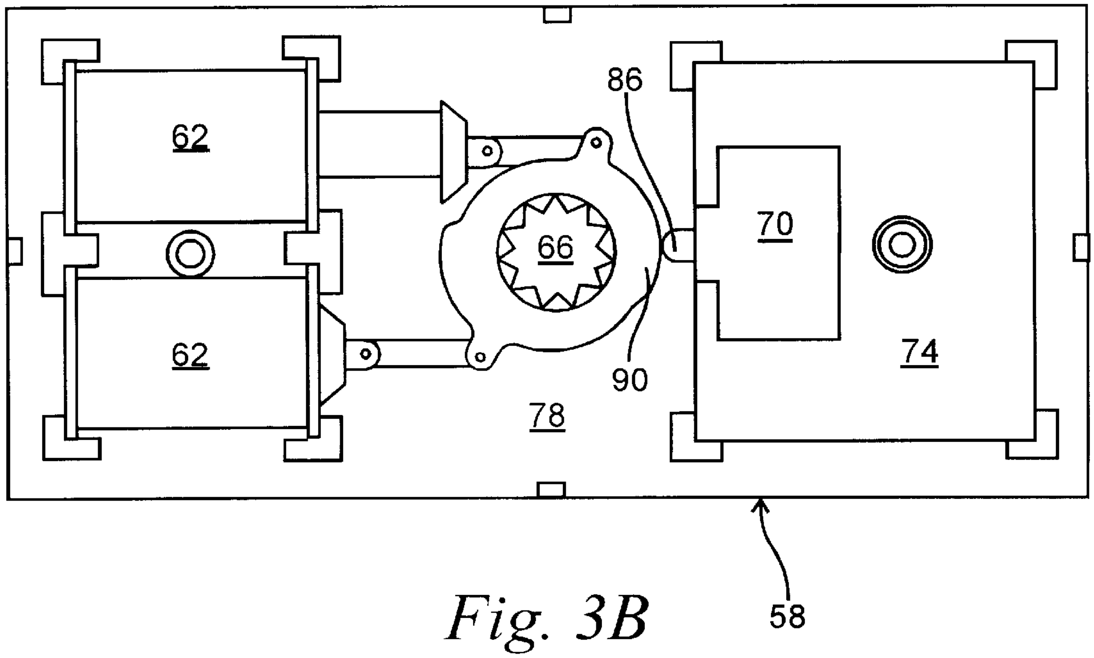
FIG. 3*b* is an interior view of an alternate embodiment of the remote switch activating module in accordance with the present invention shown in the ON position.

FIGS. 3*a* and 3*b* illustrate an interior view of a remote switch actuating module in accordance with the present invention and generally indicated by reference numeral 58. The remote switch actuating module 58 includes a linear operator 62, a mechanical interface shaft 66, a switch status indicator 70 and a printed circuit board 74, all of which are mounted on an enclosure base 78 by integrally formed means and are protected by an enclosure cover 82 (FIG. 4) which is attached to the enclosure base 78 by integrally formed means. A bearing surface for the mechanical interface shaft 66 is integrally formed from the enclosure base 78 and enclosure cover 82. The linear operator 62, which is controlled by a signal from an external or remote device such as a push-button, PLC or computer, provides the force required to operate the switch operating mechanism module 14. The linear operator 62 can be any device which is capable of producing a linear movement (force) in response to the external signal. The preferred embodiment of the linear operator 62, as shown in FIGS. 3*a* and 3*b*, is a pair of solenoids. One solenoid provides linear force for the switch ON operation while the other provides linear force for the switch OFF operation. Other embodiments of the linear operator 62 can include a tandem solenoid having one core and two coils or any pneumatic or hydraulic device which can produce a linear movement. Linear operators are preferred because they are cost effective and require only simple mechanical connections, however, it is within the scope of the invention to employ an electric motor for the required operating force. The linear operator 62 is mechanically connected to the mechanical interface shaft 66 such that linear movement produced by the linear operator 62 is translated into rotational movement which is required to operate the switch operating mechanism module 14. The switch status indicator 70 and printed circuit board 74 are optional since they are not required for basic operation of the switch actuation module 58. The switch status indicator 70 is represented as a contact block or limit switch in FIGS. 3*a* and 3*b*, but can be any device capable of producing an electrical signal in response to mechanical operation by the mechanical interface shaft 66. As shown in FIGS. 3*a* and 3*b*, the switch status indicator 70 has a plunger 86 which is moved in and out by a cam 90 integrally formed from the mechanical interface shaft 66. As the mechanical interface shaft 66 is rotated between the two stable positions of the switch operating mechanism, the ON and OFF positions of the disconnect switch, the cam 90 is also rotated, causing the plunger 86 to move in or out which changes the state of the switch status indicator 70. The electrical signal from the switch status indicator 70 is passed to a communications interface circuit on the printed circuit board 74, which in turn is connected to a display device or monitoring device at some remote location. This connection can be accomplished by hard wiring or by an industrial control network. The display device can be one or more pilot lights indicating the ON or OFF status of the disconnect switch, and the monitoring device can be a PLC, a microcomputer or other smart device connected to the industrial control network which might use or process the ON or OFF disconnect switch status information for other applications. FIGS. 3*a* and 3*b* illustrate the relative positions of the linear operator 62, mechanical interface shaft 66 and plunger 86 of the switch status indicator 70 in both of the stable ON and OFF positions of the switch operating mechanism.

Figure 4:
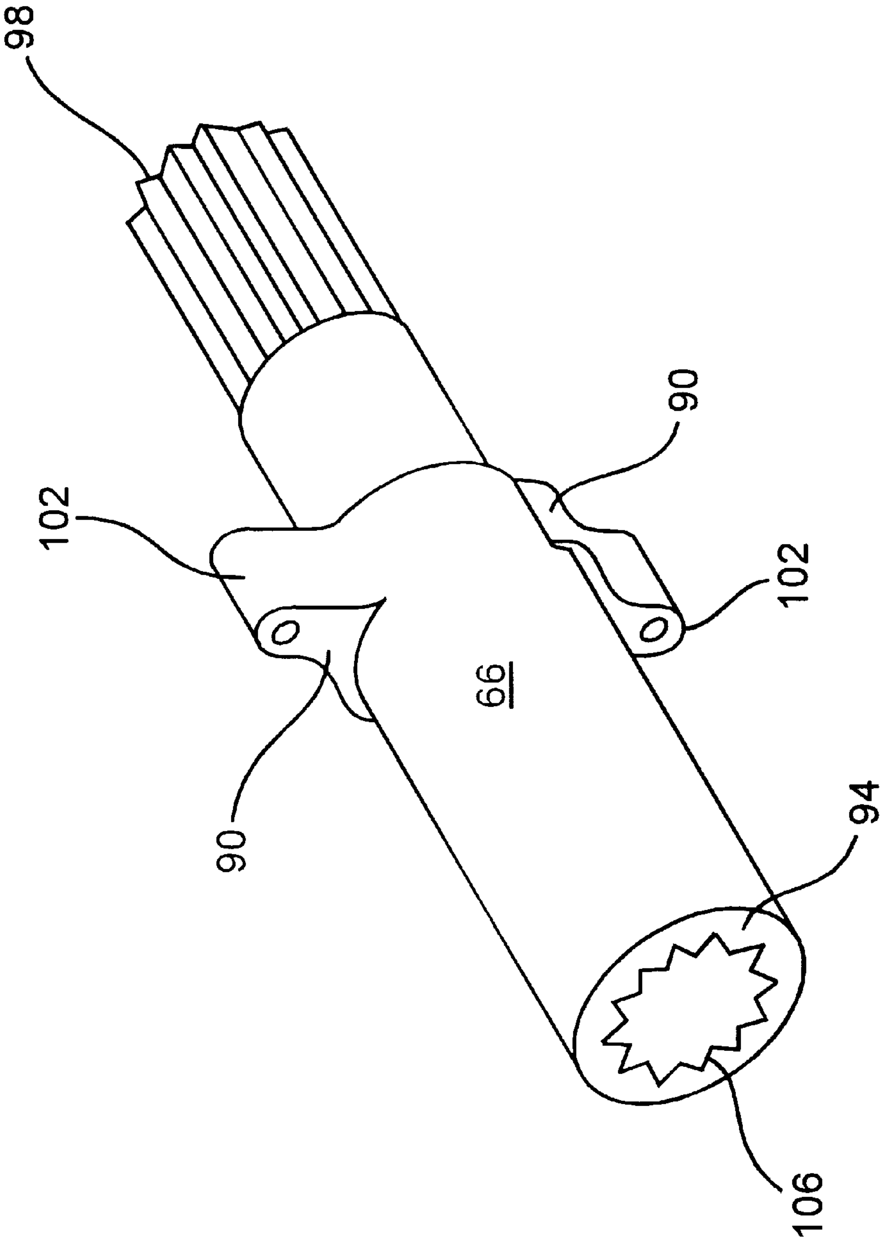
FIG. 4 is an isometric view of a mechanical interface shaft in accordance with the present invention.

Referring now to FIG. 4, the mechanical interface shaft 66, in addition to the integrally formed cam 90, includes a switch operating mechanism end 94, an operating arm end 98 and at least one linear operator connector 102. The switch operating mechanism end 94 defines an aperture 106 configured with an engagement means complementary to that of the operating end 46 of the pivot shaft 42 and is dimensioned to snugly receive the operator end 46 of the pivot shaft 42 such that the rotational movement of the mechanical interface shaft 66 can be transmitted to the pivot shaft 42 of the switch operating mechanism module 14 and ultimately to the switch blades 18. The operating arm end 98 of the mechanical interface shaft 66 is configured with the same engagement means as the operating end 46 of the pivot shaft 42 such that the hole 54 in the drive end 50 of the operating arm 30 can enable and transmit motion to the mechanical interface shaft 66 during manual operation of the disconnect switch 10.

Figure 5:
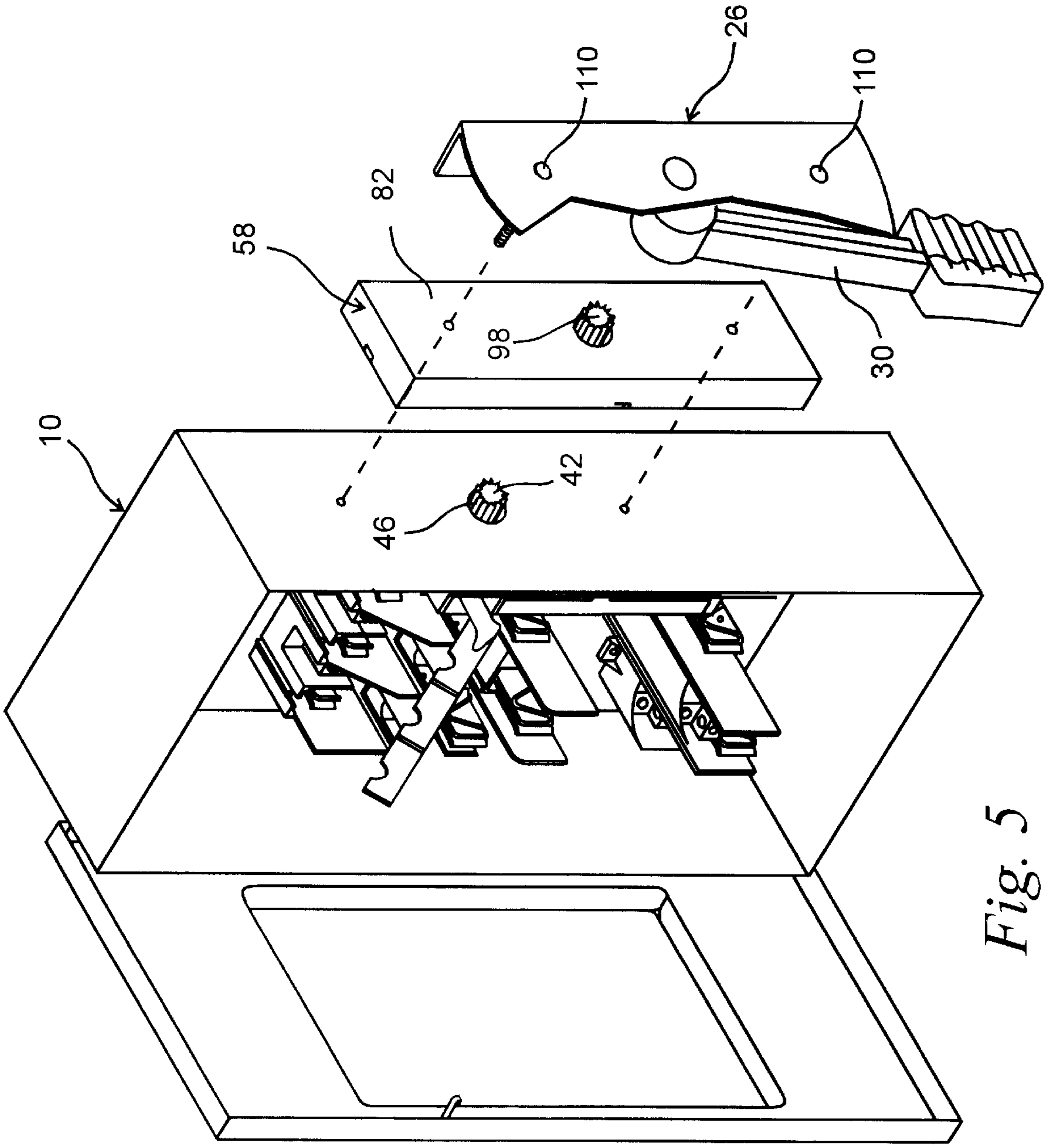
FIG. 5 is an isometric view of the modularized disconnect switch of FIG. 1 illustrating in exploded view a remote operator module in accordance with the present invention and an operating arm module.
Figure 6:
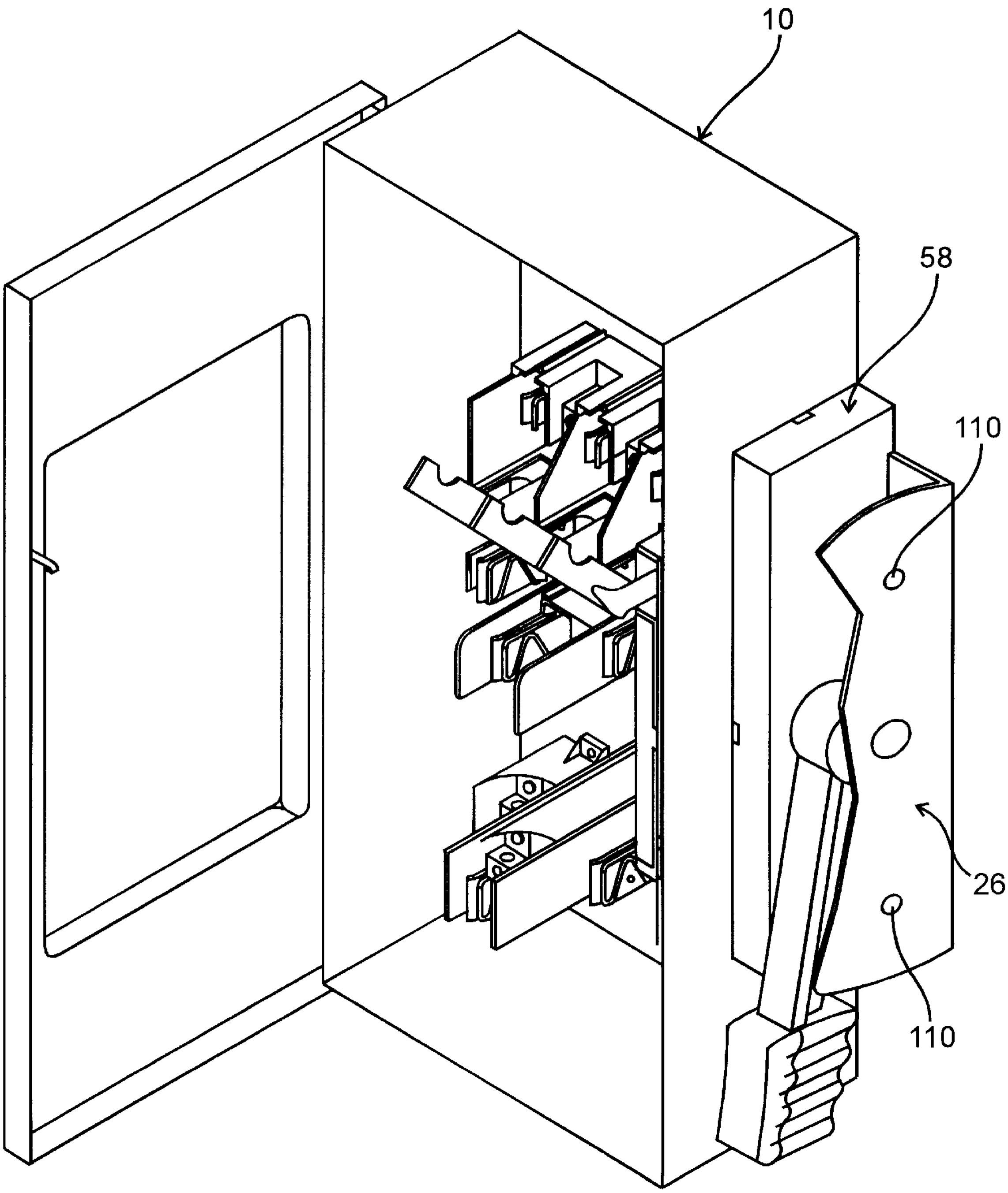
FIG. 6 is an isometric view of the modularized disconnect switch of FIG. 1 with the remote operator module and operating arm module installed.

Referring now to FIG. 5, it can be seen that retrofitting the manually operated disconnect switch 10 of FIGS. 1 and 2 is easily accomplished by removing the operator arm module 26 and placing the remote switch actuating module 58 against the disconnect switch 10 such that the aperture 106 (not shown) of the mechanical interface shaft 66 properly receives the operating end 46 of the pivot shaft 42. The operating arm module 26 is then placed against the remote switch activating module 58 such that the hole 54 of the operating arm 30 properly receives the operating arm end 98 of the pivot shaft 42. Longer screws 110 provided with the remote switch actuating module 58 are installed to simultaneously secure both the remote switch activating module 58 and the operating arm module 26 to the disconnect switch 10 as shown in FIG. 6.

Figure 7:
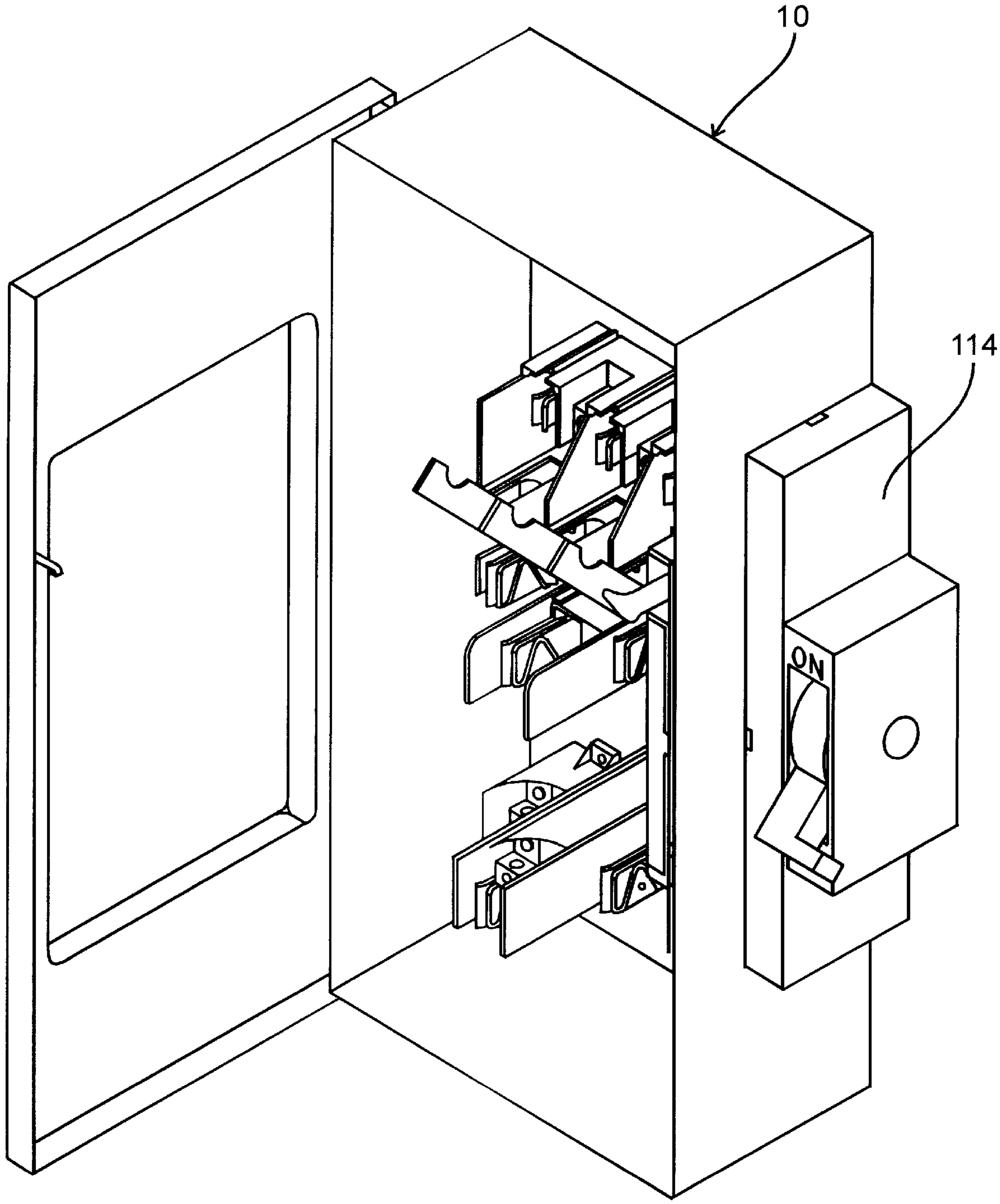
FIG. 7 is an isometric view the modularized disconnect switch of FIG. 1 with a combined remote operator/operating arm module installed.

Referring now to FIG. 7, a combination remote switch activating module and operating arm module in accordance with the present invention is generally indicated by reference numeral 114. The combination module 114 includes an operating arm and is intended to completely replace the operating arm module 26 of the disconnect switch 10.

What is claimed is:

1. A remotely operable actuator module for an enclosed disconnect switch, said actuator module comprising:

a linear operator for providing a linear force in response to an external signal;

a mechanical interface shaft for translating said linear force of said linear operator into a rotational force, and for applying said rotational force to a bi-stable switch operating mechanism within the enclosed disconnect switch for operation of the disconnect switch from one of an ON state and an OFF state to the other of said ON and OFF states;

an enclosure for supporting and protecting said linear operator and said mechanical interface shaft; and mounting means for securing said enclosure to the enclosed disconnect switch.

2. The actuator module of claim 1 wherein said linear operator is a solenoid.

3. The actuator module of claim 1 wherein said linear operator is a pneumatic cylinder.

4. The actuator module of claim 1 wherein said linear operator is a hydraulic cylinder.

5. The actuator module of claim 1 wherein said mechanical interface shaft includes a first operating end and a second operating end, said first and second operating ends being aligned along a common axis.

6. The actuator module of claim 5 wherein said first operating end includes an engagement means complementary to an engagement means of the disconnect switch operating mechanism such that linear movement of said linear operator is transferred to the disconnect switch operating mechanism through said mechanical interface shaft.

7. The actuator module of claim 5 wherein said second operating end includes an engagement means complementary to an engagement means of the disconnect switch operating arm such that rotational movement of switch operating arm is transferred to the disconnect switch operating mechanism through said mechanical interface shaft.

8. The actuator module of claim 1 further includes a switch status indicator providing a signal indicating the ON or OFF status of the disconnect switch such that a remote device can display or monitor the ON or OFF status of the disconnect switch.

9. The actuator module of claim 8 wherein said switch status indicator is operated by said mechanical interface shaft.

10. The actuator module of claim 8 wherein said switch status indicator is an electrical contact block.

11. The actuator module of claim 8 wherein said switch status indicator is a photo switch.

12. A remotely operable actuator module for changing the ON or OFF state of a modularized enclosed disconnect switch, said remote actuator module comprising:

a remote activator for providing an ON or an OFF activation signal;

a linear operator for providing a linear force in response to said activation signal;

a mechanical interface for translating said linear force into a rotational force and for applying said rotational force to the enclosed bi-stable operating mechanism of the disconnect switch;

an enclosure for supporting and protecting said linear operator and said mechanical interface; and mounting means for securing said enclosure to the enclosed disconnect switch.

13. The actuator module of claim 12 wherein said linear operator is a solenoid.

14. The actuator module of claim 12 wherein said linear operator is a pneumatic cylinder.

15. The actuator module of claim 12 wherein said linear operator is a hydraulic cylinder.

16. A remotely operable actuator module for changing the ON or OFF state of an enclosed disconnect switch having an over center switch activating mechanism, said remote actuator module comprising:

a linear operator for providing a linear force in response to an external activation signal;

a mechanical interface for translating said linear force into a rotational force and for applying said rotational force to the bi-stable over center switch activating mechanism of the enclosed disconnect switch;

a switch status indicator for providing a signal indicating the ON or OFF state of the disconnect switch;

a communications interface circuit for connecting said switch status indicator to an industrial control network such that the ON or OFF status of the disconnect switch can be monitored by other devices connected to the industrial control network;

a printed circuit board for supporting said communications interface circuit;

an enclosure for supporting and protecting said linear operator, said mechanical interface, said response indicator and said printed circuit board; and mounting means for securing said remote actuator module to the enclosed disconnect switch.

17. A method for retrofitting a manually operated disconnect switch with a remotely operable switch actuator module comprising the steps of:

removing a manually operated switch operating arm from the disconnect switch enclosure;

placing a remotely operable switch actuator module against the disconnect switch enclosure such that a mechanical interface of the remotely operable switch actuator module is in communication with the bi-stable switch operating mechanism of the disconnect switch;

placing the manually operated switch operating arm against the remotely operable switch operator module such that the manually operated switch operating arm is in communication with the mechanical interface of the remotely operable switch operator module;

attaching the remotely operable switch actuator module and the manually operated switch operating arm to the disconnect switch enclosure simultaneously with common mounting hardware; and connecting the remotely operable switch actuator module to a remote actuator.

18. A method for retrofitting a manually operated disconnect switch with a combination remotely and manually operable switch actuator module comprising the steps of:

removing a manually operated switch operating arm from the disconnect switch enclosure;

placing a combination manually and remotely operable switch actuator module against the disconnect switch enclosure such that a mechanical interface of the manually and remotely operable switch actuator module is in communication with the bi-stable switch operating mechanism of the disconnect switch;

attaching the combination manually and remotely operable switch actuator module to the disconnect switch enclosure with common mounting hardware; and connecting the remotely operable switch actuator module to a remote actuator.

* * * * *